United States Patent [19]

Ozretich

[11] 3,927,118
[45] Dec. 16, 1975

[54] PROCESS FOR MONOETHERIFICATION OF POLYHYDRIC BENZENES

[75] Inventor: Thomas M. Ozretich, Vancouver, Wash.

[73] Assignee: Crown Zellerbach Corporation, San Francisco, Calif.

[22] Filed: Dec. 21, 1973

[21] Appl. No.: 427,200

[52] U.S. Cl. ...... 260/613 D; 260/613 R; 260/465 F; 260/465 H; 260/520; 260/521 B; 260/521 P; 260/570.7
[51] Int. Cl.$^2$.......................................... C07C 43/22
[58] Field of Search ........ 260/613 D, 613 R, 465 F, 260/520, 521 B, 465 H, 521 P, 570.7

[56] References Cited
UNITED STATES PATENTS

| | | | |
|---|---|---|---|
| 2,024,534 | 12/1935 | Marx et al. | 260/613 |
| 3,274,260 | 9/1966 | Levy et al. | 260/613 D |
| 3,294,846 | 12/1966 | Livak et al. | 260/613 R |
| 3,487,114 | 12/1969 | Irick et al. | 260/613 R |
| 3,532,759 | 10/1970 | Schnell et al. | 260/613 R |
| 3,689,570 | 9/1972 | Gradeff et al. | 260/613 D |

OTHER PUBLICATIONS
Miller et al., *Jour. Org. Chem.*, Vol. 30, (1965), p. 3895–3897.

*Primary Examiner*—Bernard Helfin
*Attorney, Agent, or Firm*—Corwin R. Horton; Stanley M. Teigland

[57] ABSTRACT

Aromatic compounds having at least two hydroxyl groups on a benzene ring can be selectively converted to the corresponding monoether by reaction with an alkylating agent in the presence of an alkaline earth hydroxide or oxide in a single phase reaction medium comprising a dipolar aprotic solvent having a sulfoxy, sulfone or amide group. For example, catechol can be converted to methallyloxyphenol by reaction with methallyl chloride in the presence of calcium hydroxide in a single phase reaction medium comprising dimethyl sulfoxide. The combination of the alkaline earth base with the particular solvent minimizes undesired dietherification and carbon alkylation of the aromatic compound.

16 Claims, No Drawings

PROCESS FOR MONOETHERIFICATION OF POLYHYDRIC BENZENES

BACKGROUND OF THE INVENTION

Etherification of a hydroxy benzene, such as phenol, is generally accomplished by reacting the hydroxy benzene with an alkylating agent, such as an organic halide or sulfate, in the presence of an alkali metal hydroxide. The reaction is carried out in solution and proceeds with the initial formation of the alkali phenoxide, which in turn reacts with the alkylating agent to produce the organo ether of the phenol.

When the hydroxy benzene has two or more hydroxyl groups, difficulties are encountered in attempting to selectively form the monoether. Selective monoetherification of polyhydric benzenes does not readily take place because the monoether can react further to produce a diether. Moreover, especially reactive alkylating agents, such as those having unsaturation in the organo group, may readily alkylate ring carbon atoms, forming undesired carbon alkylation products. Formation of undesired dietherification and carbon alkylation products reduces the yield of the desired monoether and results in a mixture of compounds which are tedious and costly to separate.

The problems involved in producing monoethers from polyhydroxy benzenes are known and procedures have been suggested for avoiding these problems. U.S. Pat. No. 3,274,260 and British Pat. No. 1,041,764 disclose procedures for reducing the formation of diethers by using a two-phase system comprising water and a water-immiscible solvent. Etherification occurs in the aqueous phase and the solvent removes the monoether product from the aqueous phase, thereby minimizing further reaction with the alkylating agent. In addition to requiring a two phase system, these procedures give no control over the amount of carbon alkylation which occurs with especially reactive alkylating agents.

The problem of competing carbon alkylation in connection with etherification of monohydroxy aromatic compounds is discussed in two consecutive articles in *J. Am. Chem. Soc.* 85, 1141–1154 (1963). The articles suggest the use of aprotic solvents having high dielectric constants to minimize carbon alkylation when etherification is carried out in the presence of alkali metal salts. However, it has been found that the suggested solvents promote dietherification when alkali metal salts are employed.

SUMMARY OF THE INVENTION

This invention provides a convenient single phase process for selective monoetherification of aromatic compounds having two or more hydroxyl groups on a benzene ring. The process not only minimizes dietherification, but also minimizes carbon alkylation, especially when unsaturated alkylating agents are employed. The process comprises reacting the aromatic compound with an alkylating agent in the presence of an alkaline earth hydroxide or oxide in a single phase reaction medium comprising a dipolar aprotic solvent having a sulfoxy, sulfone or amide group. The process produces less than 15% carbon alkylation products and a ratio of monoether to diether of at least 5:1. Under preferred conditions, less than 5% carbon alkylation products are produced and the ratio of monoether to diether is at least 10:1.

DESCRIPTION OF PREFERRED EMBODIMENTS

Aromatic compounds which can be converted to the corresponding monoether in accordance with this invention include those having the formula:

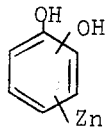

wherein each Z is hydroxyl or a group which does not interfere with the etherification reaction, and $n$ is 0 to 4. Typically, each Z may be independently selected from the group consisting of halogen, nitro, lower alkyl, cyano, carboxy, aryl (including fused aryl) having up to six carbon atoms, aralkyl having up to 11 carbon atoms, and alkaryl having up to 11 carbon atoms. The invention is particularly applicable to polyhydric benzenes, such as resorcinol, catechol, hydroquinone, pyrogallol, phloroglucinol, hydroxyhydroquinone, apionol, and the like. Especially good results are obtained with the dihydroxy benzenes, particularly catechol.

Suitable alkylating agents include organic compounds having functional alkylating groups, for example, epoxides such as ethylene oxide and propylene oxide; aziridines such as ethyleneimine, ethylethyleneimine, propyleneimine, polypropyleneimine and 1-aziridineethanol; oxonium compounds; quaternary ammonium salts; sulfoxonium salts; carbamates; organo halogens; organo sulfates; and organo sulfonates. Preferred alkylating agents have the formula RY wherein R is selected from the group consisting of alkyl, alkylene, alkaryl, and alkynyl having up to 10 carbon atoms, and Y is selected from the group consisting of chlorine, bromine, iodine, lower alkyl sulfate, and toluene sulfonate. It is advantageous to employ the process of this invention when R is unsaturated (double or triple bond), particularly when the halogen, sulfate or toluene sulfonate group is bonded to the carbon atoms adjacent to the unsaturation, and especially when R is allyl, methallyl, propargyl, or benzyl, because of the tendency of such agents to promote carbon alkylation is minimized in the process of the invention. Varying amounts of alkylating agent may be used, but improved selectivity for monoetherification is obtained when the molar ratio of alkylating agent to aromatic compound is from about 0.2 to 1.5:1. Greater amounts of alkylating agent tend to cause increased diether and/or carbon alkylation, and lesser amounts decrease the reaction rate. Therefore, a molar ratio of about 0.25 to 0.75:1 is preferred.

The solvent preferably has a dielectric constant of at least about 35. Suitable solvents include dimethyl sulfoxide, tetramethylene sulfone, dimethyl formamide, dimethylacetamide, dimethylbenzamide, N-methyl-2-pyrrolidone, and hexamethylphosphoroamide, with dimethyl sulfoxide being preferred. The molar ratio of solvent to the aromatic compound is preferably from about 3:1 to 6:1 or more.

Dipolar aprotic solvents having a dielectric constant greater than about 35, but not having a sulfoxide, sulfone or amide group, such as nitromethane and acetonitrile, are not suitable because substantially no product is formed when the solvents are employed with alkaline earth hydroxides or oxides.

The alkaline earth of the alkaline earth hydroxide or oxide is preferably calcium, barium, or strontium, more preferably calcium. The molar ratio of alkaline earth metal hydroxide or oxide to the aromatic compound is preferably about 0.5 to 1:1.

Alkali metal hydroxides are not suitable because they promote dietherification when employed with the particular solvents used in the invention.

The reagents and solvent may be charged to the reaction veseel in any sequence, but it is preferable to first dissolve the aromatic compound in the solvent, then add the alkaline earth oxide or hydroxide to ionize the hydroxyl groups of the aromatic compound, and finally add the alkylating agent.

The reaction temperatures and pressure are not critical. The reaction, which is exothermic, may conveniently be carried out at about ambient to 200°C, preferably 80°C to about 130°C, and at ambient pressure.

Separation and isolation of the monoether can be achieved through known means, such as by distillation or extraction.

EXAMPLE 1

This example illustrates the selective conversion of catechol to o-methallyloxyphenol in accordance with the invention. Catechol (27.5 grams, 0.25 mole) was dissolved in 150 ml of dimethyl sulfoxide (DMSO) under a nitrogen atmosphere. Calcium hydroxide (9.3 grams, 0.125 mole) was then added to the solution, which was stirred under nitrogen while being warmed up to 90°C. Methallyl chloride (11.3 grams of 95%, 0.119 mole) was then added slowly with stirring over a 20 minute period at 90°C. The reaction mixture was stirred for 2 hours at 90°C and then allowed to cool to 25°C. After being acidified with 10% hydrochloric acid, the solution was extracted six times with 50 ml portions of ethyl ether. The combined ether layers were dried over magnesium sulfate and the solvent was removed by rotary evaporation to give 26 grams of a brown liquid. Distillation produced 13.9 grams (71% by weight based on methallyl chloride added) of o-methallyloxyphenol and 0.7 gram (5% by weight) of the diether. No carbon alkylation products were recovered.

COMPARATIVE EXAMPLE A

The procedure of Example VI of U.S. Pat. No. 3,274,260 was followed except methallyl chloride was substituted for dimethyl sulfate. A solution of catechol (27.5 grams, 0.25 mole) in a benzene-water two-phase system was heated to reflux (70°–75°C). Then, a 50% aqueous solution of sodium hydroxide (20 grams, 0.25 mole) and methallyl chloride (22.5 grams, 0.25 mole) were added drop-wise with stirring from two separate addition funnels over a 30-minute period while a positive pressure of nitrogen was maintained over the mixture. The mixture was refluxed for an additional one-half hour, cooled to 25°C, and acidified with acetic acid. The layers were separated and the benzene layer was washed with a 5% solution of sodium sulfate. The benzene was present in the amount of 200 ml and 12.5 ml water was present. The aqueous layer was extracted three times with 50 ml portions of ethyl ether and the ether layers were later combined with the benzene layers. Gas chromatography of the combined organic layers indicated that no diether was present. However, methallyloxyphenol (MOP) and carbon-alkylated products were present in the ratio of 68:32. A large amount (24 times the total amount of MOP and carbon-alkylation products) of unreacted catechol was present. This example shows that the use of a benzene/water system with sodium hydroxide as the base gives a large amount of carbon alkylation when an unsaturated alkylating agent such as methallyl chloride is used.

COMPARATIVE EXAMPLE B

The procedure of Example A was followed except calcium hydroxide was substituted for sodium hydroxide. A solution of catechol (27.5 grams, 0.25 mole) in water was heated to reflux. After calcium hydroxide (9.3 grams, 0.13 mole) had been added, methallyl chloride (22.5 grams, 0.25 mole) was added drop-wise with stirring over a one-half hour period at 70°C to 75°C and the stirring was continued for an additional one-half hour under a nitrogen atmosphere. The mixture was cooled to 25°C and acidified with acetic acid. Gas chromatography of the benzene layer indicated that only a trace of methallyloxyphenol was present. Thus, little or no etherification or carbon alkylation occured under these conditions. This example shows that calcium hydroxide is unsuitable as a base for the alkylation of catechol with methallyl chloride in a two-phase benzene/water solvent system at 70°C.–75°C.

COMPARATIVE EXAMPLE C

The procedure of Example A was followed except DMSO was substituted for the benzene-water system. A solution of catechol (27.5 grams, 0.25 mole) in 212 ml of DMSO was heated to 75°C under nitrogen atmosphere. Methallyl chloride (27.5 grams, 0.25 mole) and 50% sodium hydroxide (20 grams, 0.25 mole) were added with stirring from two separate addition funnels over a one-half hour period at 75°C. The mixture was stirred an additional one-half hour at 75°C and then cooled to 25°C. After acidification with acetic acid, the reaction mixture was extracted three times with 70 ml portions of ether. Gas chromatography of the combined ether layers indicated that methallyloxyphenol and the diether (o-dimethallyloxybenzene) were present in the ratio of 53:47. No carbon alkylation products and only a trace of catechol could be detected. This example shows that while the combination of DMSO with sodium hydroxide produces no carbon alkylation, it does produce large amounts of diether.

EXAMPLES 2–9

These examples illustrate the practice of the invention following the general procedure of Example 1 using different bases and reaction conditions. The results are reported in Table I, which shows the amounts of monoether, diether and catechol produced relative to each other, and the amount of carbon alkylation products produced relative to the total amount of the other three compounds. In each example 0.5 mole catechol was reacted with methallyl chloride in the presence of 0.25 mole base using DMSO as the solvent. In Examples 2 and 3, the barium hydroxide was employed as the octahydrate.

TABLE I

| Example | ml DMSO | Base | Temp.°C | Time Hours | Mole Halide | C-alk | ono | Di | Catechol | Ratio Monoether/ Diether |
|---|---|---|---|---|---|---|---|---|---|---|
| 2 | 300 | Ba(OH)₂ | 95 | 5 | 0.5 | 3 | 61 | 20 | 19 | 3.1 |
| 3 | 300 | Ba(OH)₂ | 95 | 2 | 0.25 | 2.5 | 76 | 8 | 16 | 9.5 |
| 4 | 300 | Ca(OH)₂ | 90 | 2 | 0.25 | 0 | 88 | 5 | 7 | 17.5 |
| 5 | 150 | Ca(OH)₂ | 85 | 2 | 0.25 | 13.5 | 59 | 5 | 36 | 11.8 |
| 6 | 150 | CaO | 85 | 2 | 0.25 | 2.5 | 65 | 6 | 29 | 10.8 |
| 7 | 300 | CaO | 90 | 2 | 0.25 | 0 | 78 | 5 | 17 | 15.5 |

The relatively large amount of carbon alkylation products produced in Example 5, compared to the other examples, might be due to the reduced amount of solvent employed when Ca(OH)₂ is used as the base. The base generates water, which is known to promote carbon alkylation. However, it is possible that the solvent, when employed in large amounts, inhibits this effect of water.

COMPARATIVE EXAMPLES D-K

These examples illustrate the inferior results obtained using solvent-base combinations other than in accordance with the invention. The results are reported in Table II, which shows the relative amounts of catechol and products as in Table I. In each example, 0.5 mole catechol was reacted with methallyl chloride using a total of 300 ml of solvent. The amount of base employed was 0.5 mole when NaOH was used and 0.25 mole when the other bases were used. In Examples D, E and F, "TCE" refers to trichloroethylene.

Table III indicates that aprotic dipolar solvents which do not have a sulfoxide, sulfone or amide group are unsuitable even through they may have a dielectric constant above 35.

Table III also indicates that dimethylacetamide and dimethylformamide give good results and that best results are obtained with DMSO.

The foregoing examples demonstrate the critical impact of the solvent-base system on the production of monoethers from dihydric benzenes, especially when an unsaturated alkylating agent such as methallyl chloride is employed. The examples clearly indicate that the solvent-base system of the invention affords a convenient single phase process for selectively producing monoethers with minimal dietherification and carbon alkylation. In addition, the process produces good yields of the monoethers under moderate conditions with relatively short reaction periods.

I claim:

1. In a process for converting an aromatic compound having at least two hydroxyl groups on a benzene ring to the corresponding monoether by reacting the compound with an alkylating agent in the presence of a base in a reaction medium, the improvement wherein the reaction is carried out in a single phase in which the reaction medium comprises a dipolar aprotic solvent having a sulfoxide, sulfone or amide group, and the base is an alkaline earth hydroxide or alkaline earth oxide.

2. The process of claim 1 wherein the solvent has a dielectric constant of at least about 35.

TABLE II

| Example | Solvent | Base | Temp.°C. | Time Hours | Mole Halide | C-alk | ono | Di | Catechol | Ratio Monoether/ Diether |
|---|---|---|---|---|---|---|---|---|---|---|
| D | H₂O/TCE | Ba(OH)₂ | 105 | 5 | 0.5 | 56 | 56 | 0 | 44 | — |
| E | MeOH/TCE | Ba(OH)₂ | 105 | 5 | 0.5 | 11 | 59 | 11 | 30 | 5.4 |
| F | MeOH/TCE | BaO | 105 | 5 | 0.75 | 5 | 41 | 8 | 51 | 5.1 |
| G | MeOH | Ba(OH)₂ | 100 | 5 | 0.5 | 12 | 35 | 1 | 64 | 35.0 |
| H | MeOH | CaO | 120 | 5 | 0.25 | 13 | 11 | 0 | 89 | — |
| I | H₂O | Ca(OH)₂ | 85 | 2½ | 0.25 | 16 | 18 | trace | 82 | — |
| J | DMSO | 50% NaOH | 90 | 2 | 0.25 | trace | 69 | 24 | 7 | 2.9 |
| K | DMSO | NaOH | 90 | 2 | 0.25 | trace | 67 | 24 | 9 | 3.0 |

EXAMPLES 8-11 AND COMPARATIVE EXAMPLES L-O

The suitability of various aprotic dipolar solvents was determined by employing them in the general procedure of Example I. The results are reported in Table III. In each example except Example O, 0.5 mole of catechol was reacted with 0.25 mole methallyl chloride at 80°-90°C in the presence of 0.25 mole calcium hydroxide or oxide using 300 ml of solvent. In Example O, the reaction was carried out in an autoclave at 115°C.

TABLE III

| Example | Solvent | Dielectric Constant | Time, hours | Mono ether | Di-ether | Carbon alkylation |
|---|---|---|---|---|---|---|
| L | Nitromethane | 35.9 | 2 | 0 | 0 | 0 |
| M | Acetonitrile | 37.5 | 2 | 0 | 0 | 0 |
| N | Methyl Ethyl Ketone | 18.5 | 2 | 0 | 0 | 0 |
| O | Acetone | 20.7 | 5 | trace | 0 | trace |
| 8 | Dimethylformamide | 36.7 | 2 | 36 | 0.8 | 2.2 |
| 9 | Dimethylacetamide | 37.8 | 2 | 39 | 1.0 | 2.0 |
| 10 | Dimethylacetamide | 37.8 | 7 | 53 | 1.5 | 2.5 |
| 11 | Dimethyl Sulfoxide | 46.7 | 2 | 74 | 3 | 0 |

3. The process of claim 1 wherein the solvent is dimethyl sulfoxide, dimethylformamide, dimethylacetamide, dimethylbenzamide, N-methyl-2-pyrrolidone, tetramethylene sulfone, or hexamethylphosphoroamide.

4. A process for preparing monoethers having the formula:

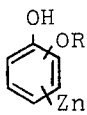

wherein each Z is independently selected from the group consisting of hydroxy, halogen, nitro, lower alkyl, cyano, lower alkoxy, carboxy, aryl (including fused aryl) having up to six carbon atoms, aralkyl having up to 11 carbon atoms, and alkaryl having up to 11 carbon atoms, $n$ is from 0 to 4, and R is selected from the group consisting of alkyl, alkaryl, alkylene, and alkynyl groups having up to 10 carbon atoms, which process comprises reacting an aromatic compound having the formula:

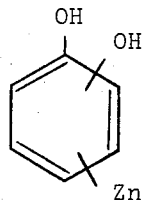

wherein Z and $n$ are defined above, with an alkylating agent having the formula RY wherein R is as defined above and Y is selected from the group consisting of chlorine, bromine, iodine, lower alkyl sulfate and toluene sulfonate, the reaction being carried out in the presence of an alkaline earth hydroxide or alkaline earth oxide in a single phase reaction medium comprising a dipolar aprotic solvent having a sulfoxide, sulfone or amide group.

5. The process of claim 4 wherein the solvent has a dielectric constant of at least about 35.

6. The process of claim 4 wherein the solvent is dimethyl sulfoxide, dimethylformamide, dimethylacetamide, N-methyl-2-pyrrolidone or tetramethylene sulfone.

7. The process of claim 4 wherein R is alkaryl, alkylene or alkynyl and Y is bonded to a carbon atom adjacent to the unsaturation.

8. The process of claim 7 wherein R is allyl, methallyl, propargyl or benzyl.

9. The process of claim 8 wherein Y is chlorine, bromine, or iodine.

10. The process of claim 4 wherein $n$ is 0.

11. The process of claim 7 wherein $n$ is 0.

12. The process of claim 11 wherein the solvent is dimethyl sulfoxide, dimethylformamide, dimethylacetamide, dimethylbenzamide, N-methyl-2-pyrrolidone, tetramethylene sulfone or hexamethylphosphoroamide.

13. The process of claim 12 wherein R is allyl or methallyl.

14. The process of claim 13 wherein Y is chlorine, bromine, or iodine.

15. The process of claim 14 wherein the alkaline earth is calcium, barium or strontium and the solvent is dimethyl sulfoxide.

16. The process of claim 15 wherein the aromatic compound is catechol.

* * * * *